(12) United States Patent
Takahashi

(10) Patent No.: US 7,507,024 B2
(45) Date of Patent: Mar. 24, 2009

(54) TEMPERATURE SENSOR

(75) Inventor: Sotoo Takahashi, Okazaki (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 35 days.

(21) Appl. No.: 11/594,815

(22) Filed: Nov. 9, 2006

(65) Prior Publication Data
US 2007/0104247 A1 May 10, 2007

(30) Foreign Application Priority Data
Nov. 9, 2005 (JP) .............................. 2005-324672
Sep. 26, 2006 (JP) .............................. 2006-259972

(51) Int. Cl.
*G01K 1/00* (2006.01)
*G01K 7/00* (2006.01)
*G01K 13/00* (2006.01)

(52) U.S. Cl. ........................ 374/185; 374/208; 374/148

(58) Field of Classification Search ................. 374/185, 374/208, 148
See application file for complete search history.

(56) References Cited

U.S. PATENT DOCUMENTS

| 5,481,240 A | 1/1996 | Fukaya et al. |
| 6,264,363 B1 | 7/2001 | Takahashi et al. |
| 6,338,571 B1 * | 1/2002 | Chen ........................... 374/208 |
| 6,639,505 B2 | 10/2003 | Murata et al. |
| 7,012,502 B2 * | 3/2006 | Shibayama ................... 338/28 |
| 2007/0104247 A1 * | 5/2007 | Takahashi ..................... 374/185 |
| 2007/0195857 A1 * | 8/2007 | Krishnamurthy et al. ..... 374/148 |

FOREIGN PATENT DOCUMENTS

| JP | 7-043220 | 2/1995 |
| JP | 2000-97781 | 4/2000 |
| JP | 2004-233236 | 8/2004 |

OTHER PUBLICATIONS

German Office Action dated Feb. 29, 2008 issued in corresponding German Application No. 10 2006 035 413.3 with English translation.

* cited by examiner

*Primary Examiner*—Gail Verbitsky
*Assistant Examiner*—Mirellys Jagan
(74) *Attorney, Agent, or Firm*—Nixon & Vanderhye PC

(57) ABSTRACT

A temperature sensor has a thermistor element equipped with a pair of electrodes, a sheath pin into which a pair of signal lines is built, and a cover surrounding the thermistor element. A front part of each signal line is exposed from the sheath pin. The cover is placed at a front part of the temperature sensor. The cover has a contact positioning part with which the front part of the sheath pin is contacted. Cement is filled into a space between the cover and the thermistor element in front of the front part of the contact positioning part. Through the cement, the thermistor element is supported by and fixed to the cover. A front inside space formed in front of the front part of sheath pin and a peripheral inside space formed in a rear side of the front part of the sheath pin are formed between the front part of the sheath pin and the inside surface of the cover.

15 Claims, 18 Drawing Sheets

TEMPERATURE SENSOR

CROSS-REFERENCE TO RELATED APPLICATIONS

This application is related to and claims priority from Japanese Patent Applications No. 2005-324672 filed on Nov. 9, 2005, and No. 2006-259972 filed on Sep. 26, 2006 the contents of which are hereby incorporated by reference.

BACKGROUND OF THE INVENTION

1. Field of the Invention

The present invention relates to a temperature sensor using a thermistor element.

2. Description of the Related Art

There is a temperature sensor incorporating a thermistor element capable of measuring the temperature of an exhaust gas emitted from an internal combustion engine mounted on a vehicle. Japanese laid open publication NO. 2000-97781 had disclosed such a conventional temperature sensor incorporating a thermistor element whose resistance value is changed according to an ambient temperature change.

Such a temperature sensor is composed of a thermistor element incorporating a pair of electrodes, a sheath pin incorporating a pair of signal lines connected to the electrode pair therein, and a cover located at a front part of the temperature sensor, which covers the thermistor element.

However, in the above conventional temperature sensor, the thermistor element is only connected to a pair of the signal lines in the sheath pin. When the temperature sensor is vibrated, for example, during the running of the vehicle on which the temperature sensor is mounted, the thermistor element is vibrated, and the vibration brings the temperature sensor to a possibility of forcedly contacting the thermistor element with the cover. In particular, when the temperature sensor is placed near the internal combustion engine of the vehicle, severe or large vibration is applied to the temperature sensor, and the vibration increases a possibility of forcedly contacting the temperature sensor with the cover, and severe shock is thereby applied to the thermistor element.

In order to avoid this drawback, another conventional technique, for example, Japanese patent 3296034 has disclosed a temperature sensor in which the inside space in a cover in which a thermistor element is embedded is filled with cement having a superior thermal conductivity in order to forcedly fix the thermistor element to the cover by the cement. In the manufacturing process of producing such a temperature sensor, cement and water are mixed at the beginning, and the cement involving water is poured into the inside space of the cover, and then the thermistor element connected to the signal lines of the sheath pin is inserted into the cover, and the cement involving water is dried in order to evaporate the water component and to support and tightly fix the thermistor element to the cover. However, this conventional technique requires a positioning tool to position and place the thermistor element at an optimum position in the inside of the cover without contacting the thermistor element with the cover. The conventional temperature sensor has a tapered part formed in a part of the cover, and the thermistor element is positioned while contacting a front part of the sheath pin with the taper part of the cover. This conventional positioning manner using the positioning tool satisfies such a requirement to avoid the drawback described above. (In addition, see FIG. 19, FIG. 20, and FIG. 21 as related-art comparison example.)

However, this technique of the conventional positioning manner technique causes another drawback that the front part of the sheath pin seals up the inside of the cover, and it is thereby difficult to drain, namely, to dry water involved in the cement because the water component involved in the cement is hardly drained from the inside of the cover to the outside of the temperature sensor, and the cement is not dried easily.

SUMMARY OF THE INVENTION

It is an object of the present invention to provide an improved temperature sensor composed of a cover, a sheath pin, and a thermistor element embedded in the cover, capable of easily performing a positioning of the thermistor element to the cover, and of confidently fixing the thermistor element in the cover.

To achieve the above purposes, the present invention provides a temperature sensor having a thermistor element, a sheath pin, a cover, and cement. The thermistor element has a pair of electrodes embedded in the cover. In the sheath pin, a pair of signal lines is embedded and the signal line pair is connected to the electrode pair, respectively. A front part of each signal line is exposed from the sheath pin. The cover is arranged at a front part of the temperature sensor. The cover surrounds the thermistor element and a front part of the sheath pin. The cover has a contact positioning part with which the front part of the sheath pin contacts correctly. The inside space in the front part of the cover, in which the thermistor element is embedded, located in front of the contact positioning part is filled with cement. The cement supports and fixes the thermistor element to the cover. In the temperature sensor, connection paths are formed between the front part of the sheath pin and the inside surface of the cover. Through the connection paths, the front inside space of the cover located in front of the front part of the sheath pin is joined to a peripheral inside space of the cover in a rear side in the front part of the sheath pin.

Because the temperature sensor of the present invention has the contact positioning part formed in the cover, it is possible to easily perform the positioning of the sheath pin to the cover in the axis direction of the temperature sensor. It is thereby also possible to easily perform the positioning of the thermistor element having the electrodes, to the cover, that are connected to the signal line pair of the sheath pin. That is, because the present invention can determine an optimum and accurate position of the sheath pin in the inside of the cover when the thermistor element is inserted into the cover during the manufacturing process of the temperature sensors, it is possible to insert the thermistor element into the cover without fear of it contacting the front part of the cover.

In addition, in the manufacturing of the temperature sensor, the cement involving water is poured into the inside of the cover and at the same time, the thermistor element is placed in the cover. At this time, the positioning of the thermistor element to the cover is carried out easily by contacting the front part of the thermistor element with the contact positioning part formed in the inside of the cover. The drying process is then carried out.

One or more of the connection paths are formed between the front part of the sheath pin assembled in the cover and the inside surface of the cover. Through one or more connection paths, the front inside space of the cover is joined to the peripheral inside space of the cover. During the drying process, water involved in the cement is drained or discharged into the outside of the temperature sensor through one or more connection paths. This can promote the drying step of the cement, and thereby the thermistor element is fixed to the cover, easily, rapidly, and certainly. This can increase the manufacturing efficiency and reduce the total manufacturing time and cost.

As described above, the present invention provides the temperature sensor capable of easily and certainly performing the positioning and fixing the thermistor element to the cover.

According to another aspect of the present invention, it is preferred that a cross-section of the contact positioning part in the cover has a polygonal shape. This can easily form the contact positioning part and the connection paths. That is, parts forming the contact positioning part are formed at the sides of the polygonal shaped cover and the connection paths are formed at the corners of the polygonal shaped cover.

Further, according to another aspect of the present invention, it is preferred that the surface of the front part of the sheath pin has a polygonal shape. This can easily form the contact positioning part and the connection paths. The feature of this configuration brings to easily form the contact positioning part and the connection paths. That is, the parts forming the contact positioning part are formed at the corners of the polygonal shaped cover and the connection paths are formed at the sides of the polygonal shaped cover.

Still further, according to another aspect of the present invention, it is preferred that the cover has convex parts that are projecting into the inside of the cover at the position where the front part of the sheath pin is placed. In this case, the contact positioning part is formed at the convex parts and the connection paths are formed at the area where no convex part is formed.

Still further, according to another aspect of the present invention, it is preferred that the cover has concave parts that are projecting into the outside of the cover at the position where the front part of the sheath pin is placed. In this case, the connection paths are formed at the concave parts and the contact positioning part is formed at the area where no concave part is formed.

Moreover, according to another aspect of the present invention, it is preferred that the cover has a tapered part that is inclined from the front part toward the rear part of the temperature sensor. The contact positioning part is formed at the tapered part of the cover. In this case, it is possible to easily form the connection positioning part in the cover.

Further, according to another aspect of the present invention, it is acceptable that the sheath pin has one or more notch parts formed on an outer peripheral part of the front part of the sheath pin. In this configuration, the contact part is formed at the area where no notch part is formed, and the connection part is formed at the notch part. In addition, it is acceptable to form one or more notch parts at the front part of the sheath pin.

Still further, according to another aspect of the present invention, it is acceptable that the notch part has a flat surface. This shape of the notch part can be easily worked in manufacturing.

Still furthermore, according to another aspect of the present invention, it is acceptable to form the notch part having a groove shape. This shape of the notch part can easily form the connection path of an adequate size.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
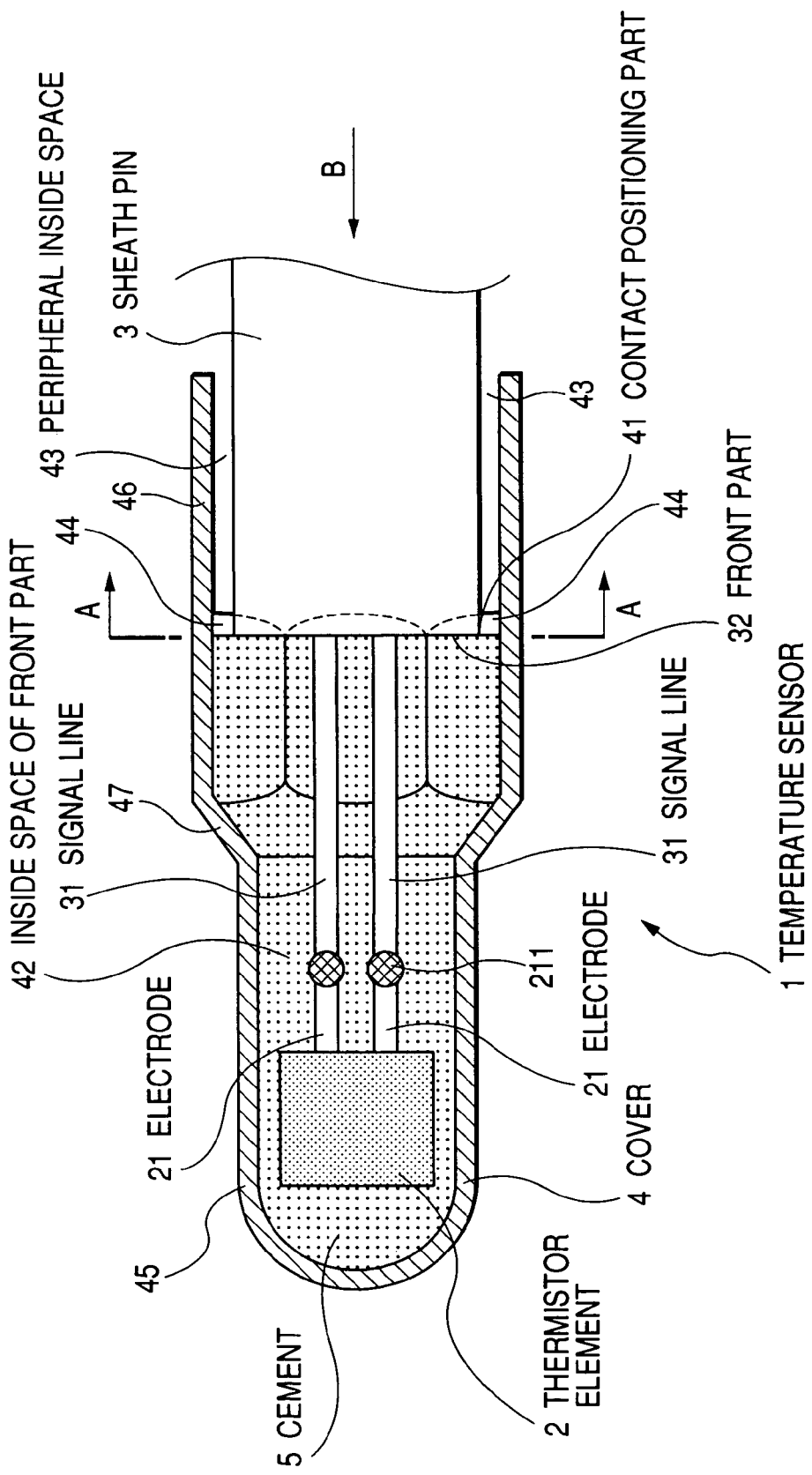
FIG. 1 is a sectional view showing a part near a front part of a temperature sensor in the axis direction thereof according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the temperature sensor according to the first embodiment of the present invention with reference to FIG. 1 to FIG. 7.

Figure 2:
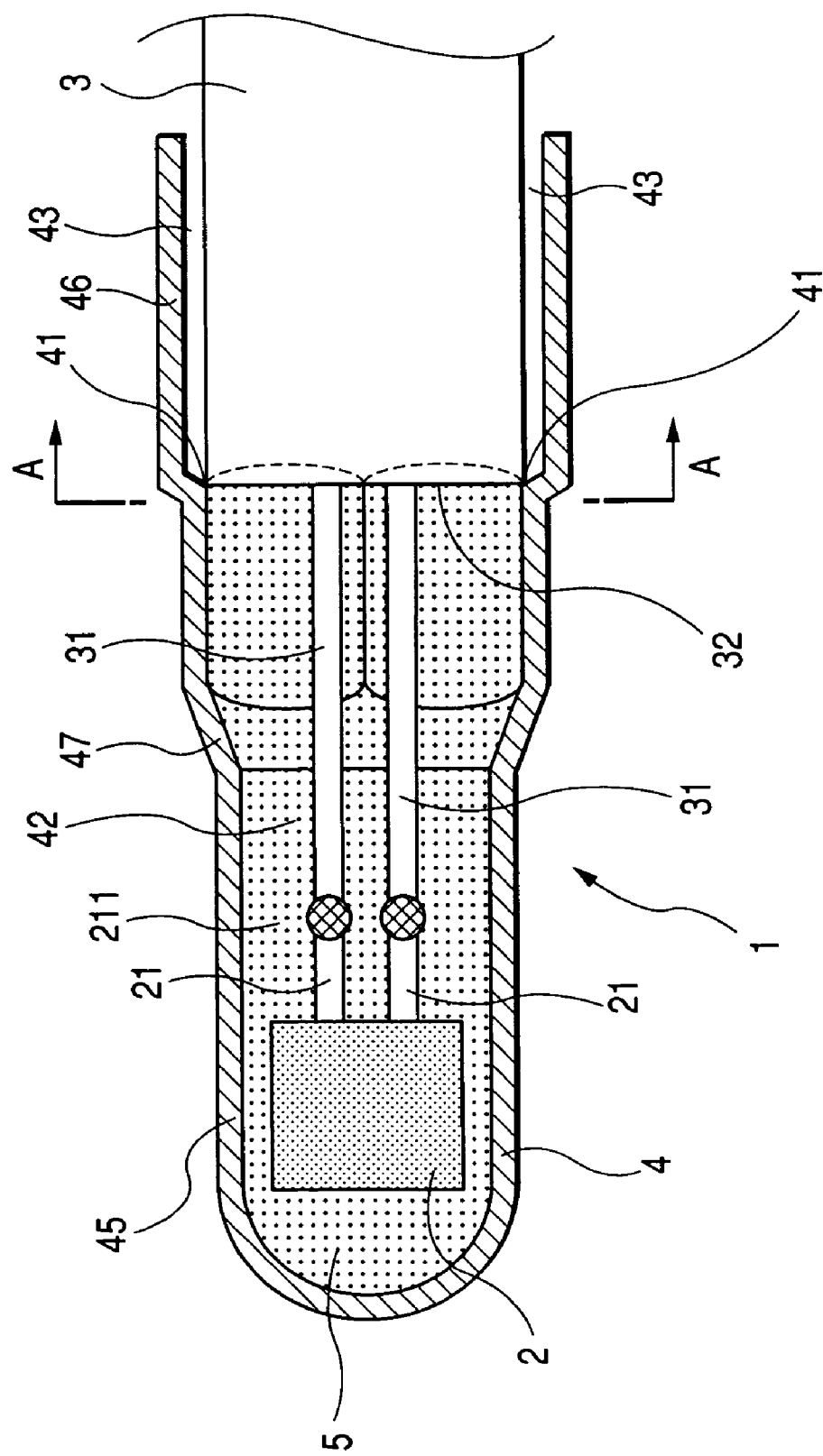
FIG. 2 is another sectional view showing the area near the front part of the temperature sensor in the axis direction thereof according to the first embodiment.
Figure 3:
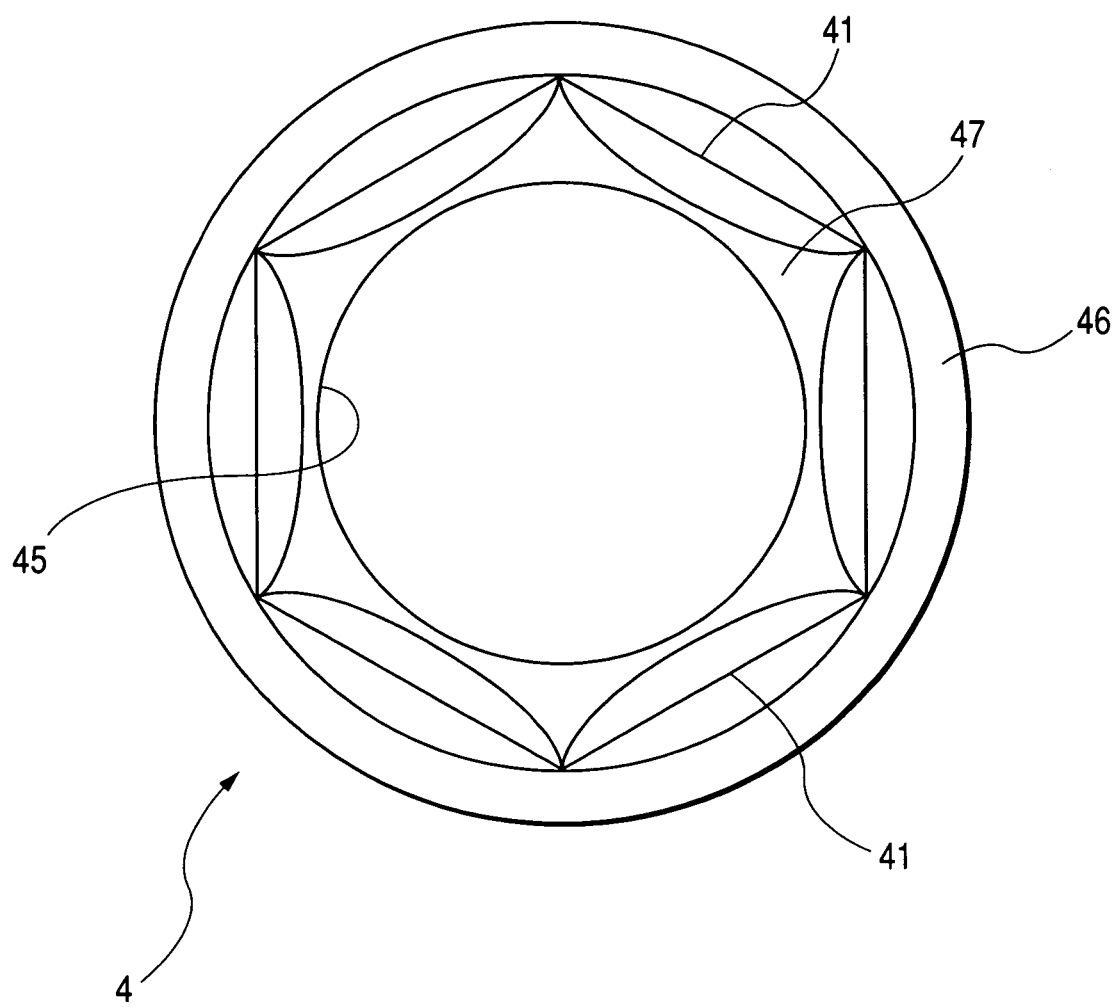
FIG. 3 is a view showing only a cover placed at a rear part of the temperature sensor according to the first embodiment, observed from the direction indicated by the arrow B shown in FIG. 1.
Figure 6:
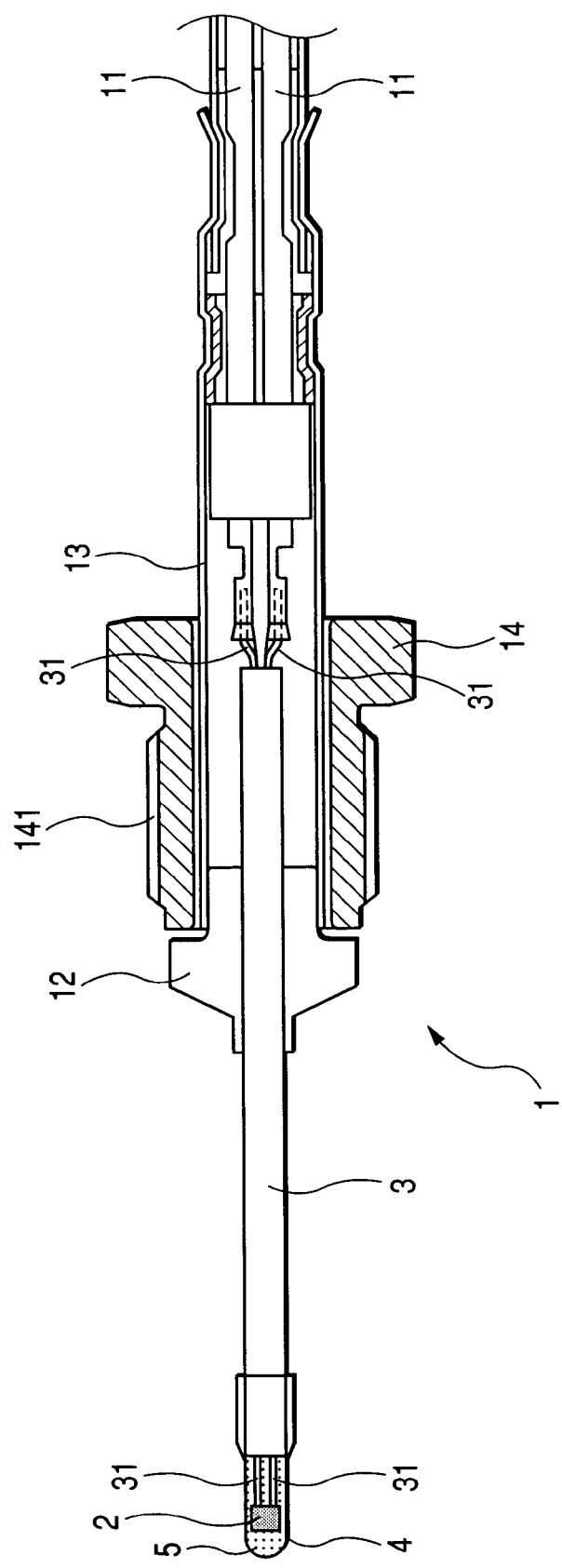
FIG. 6 is a sectional view of the temperature sensor in the axis direction thereof according to the first embodiment.

FIG. 1 is a sectional view showing a part near a front part of the temperature sensor 1 in the axis direction thereof according to the first embodiment. FIG. 2 is another sectional view showing the area near the front part of the temperature sensor 1 in the axis direction thereof. FIG. 3 is a view showing only a cover 4 placed at a front part of the temperature sensor 1 of the first embodiment, observed from the direction indicated by the arrow B shown in FIG. 1. FIG. 6 is a sectional view of the temperature sensor 1 in the axis direction according to the first embodiment.

As shown in FIG. 1, FIG. 2, and FIG. 6, the temperature sensor 1 has a thermistor element 2, a sheath pin 3, and a cover 4. The thermistor element 2 is composed of a pair of electrodes 21 (or electrode wires 21). In the sheath pin 3, a pair of signal lines connected to a pair of the electrodes 21 is embedded. The cover 4 is placed at a front part of the temperature sensor 1 covering the thermistor element 2. The sheath pin 3 is made of a cable such as a mineral insulated (MI) cable that is widely known.

Figure 4:
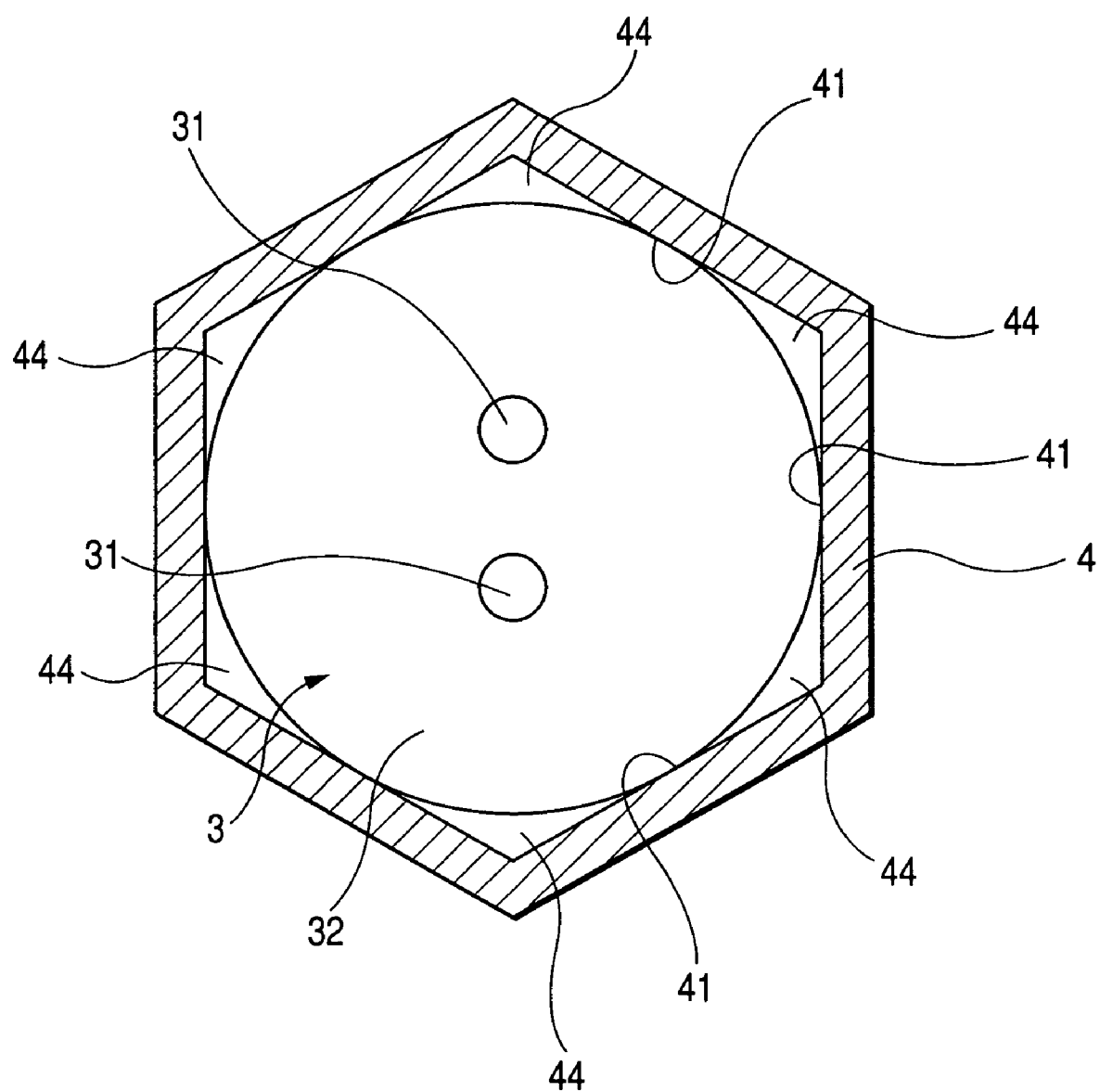
FIG. 4 is a sectional view of the temperature sensor according to the first embodiment along the line A-A shown in FIG. 1 or FIG. 2.

FIG. 4 is a sectional view of the temperature sensor 1 along the line A-A shown in FIG. 1 or FIG. 2.

As shown in FIG. 2 and FIG. 4, the cover 4 has a contact positioning part 41 through which the sheath pin 3 is positioned to the cover 4 by contacting a front part 32 of the sheath pin 3 with the contact positioning part 41.

As shown in FIG. 1 and FIG. 2, a part in front of the contact positioning part 41 between the cover 4 and the thermistor element 2 is filled with cement in order to support and fix the thermistor element 2 to the cover 4.

As shown in FIG. 1 and FIG. 4, connection paths 44 are formed between the front part 32 of the sheath pin 3 and the inside surface of the cover 4. Through the connection paths 44, a front inside space 42 of the cover 4, which is formed in front of the front part 32 of the sheath pin 3, is joined to a peripheral inside space 43 of the cover 4, which is placed at the rear side of the front part 32 of the sheath pin 3. As shown in FIG. 1 and FIG. 2, the peripheral inside space 43 is formed between the inside surface of the cover 3 and the sheath pin 3.

As shown in FIG. 4, a part of the cover 4 at the contact positioning part 41 has a hexagonal cross section. The cover 4 is made of stainless steel, and the front part of the cover 4 has an approximate hemisphere shape and is sealed with the cement 5 as shown in FIG. 1 and FIG. 2. That is, the cover 4 is composed of a small diameter part 45, a large diameter part 46, and a taper part 47. The small diameter part 45 of the cover 4 surrounds the thermistor element 2 and the large diameter part 46 surrounds the sheath pin 3. The taper part 47 is formed between the small diameter part 45 and the large diameter part 46.

Figure 5:
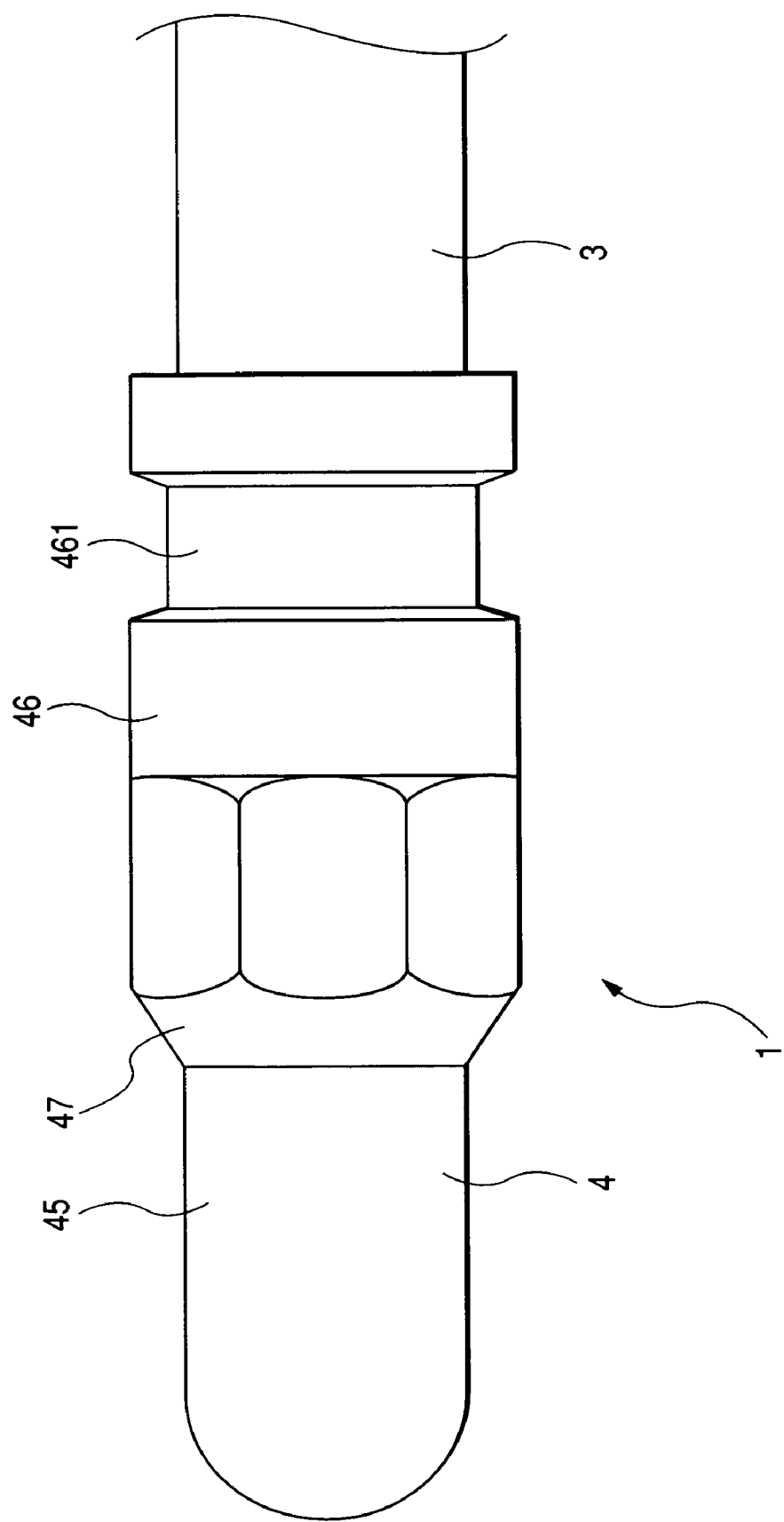
FIG. 5 is a side view of the area near the front part of the temperature sensor according to the first embodiment.

FIG. 5 is a side view of the area near the front part of the temperature sensor 1 of the first embodiment.

As shown in FIG. 5, the cover 4 has a fastening part 461 formed in the large diameter part 46 capable of fastening the sheath pin 3 to which the fastening force is applied from the outer peripheral side. The fastening part 461 and the sheath pin 3 are welded together. Notice that FIG. 1 and FIG. 2 show the temperature sensor 1 before performing the welding of the fastening part 461. That is, FIG. 5 shows the temperature sensor 1 after the completion of the welding. Similarly, FIG. 9, FIG. 10, FIG. 13, FIG. 16, FIG. 17, and FIG. 24 also show the temperature sensor before performing the welding to weld the fastening part.

Figure 7:
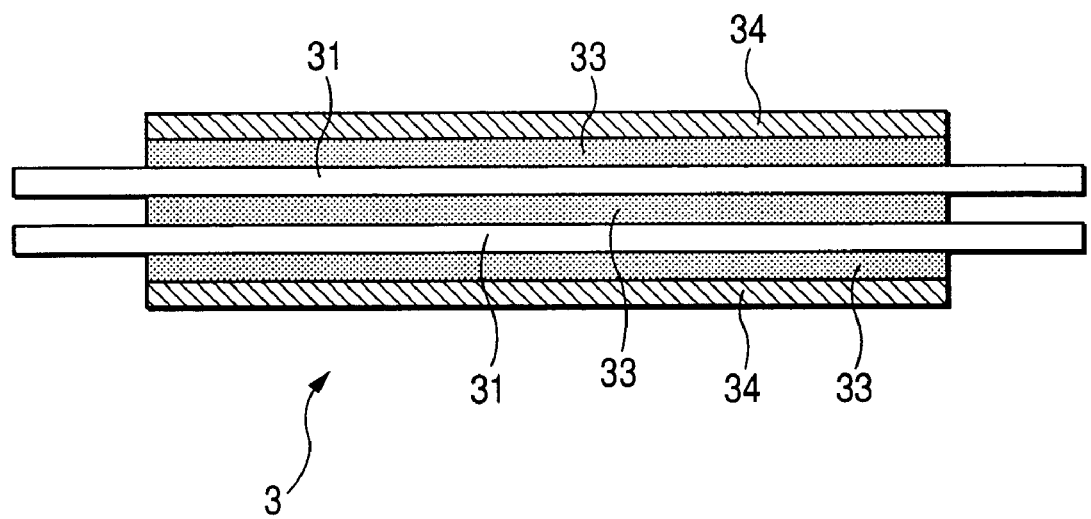
FIG. 7 is a sectional view of a sheath pin of the temperature sensor in the axis direction thereof according to the first embodiment.

FIG. 7 is a sectional view of the sheath pin 3 of the temperature sensor 1 in the axis direction thereof according to the first embodiment.

As shown in FIG. 7, the sheath pin 3 is composed of a pair of signal lines 31 made of stainless steel, an insulating part 33 made of insulating powder such as magnesia filled around the signal lines 31 in the sheath pin 3, and an outer pipe part 34 made of stainless steel surrounding the outer periphery of the insulating part 33. For example, the sheath pin 3 is made of a mineral insulated (MI) cable.

The outer pipe part 34 in the sheath pin 3 has a cylindrical shape. As shown in FIG. 1, FIG. 2, FIG. 6, and FIG. 7, a part of each signal line 31 is exposed from the sheath pin 3 in front of the front side of the insulating part 33 and the outer pipe part 34. A part of each signal line 31 is also exposed at a rear side of the outer pipe part 34 and the insulating part 33. The tip of each signal line 31 and the corresponding electrode 21 (or electrode wire) of the thermistor element 2 are electrically connected together through the connection part 211 which is welded, as shown in FIG. 1 and FIG. 2. The rear part of the signal line 31 is connected to an external lead wire 11 of the temperature sensor 1 (see FIG. 6).

Further, as shown in FIG. 6, the sheath pin 3 is supported by a rib 12 made of stainless steel. At the rear side of the rib 12, a protection tube 13 made of stainless steel is attached so as to cover a rear part of the sheath pin 3 and a part of the external lead wire 11. Further, the protection tube 13 is inserted into and fixed to a housing 14 with a fixing screw 141.

The thermistor element 2 is fixed to the cover 4 by a following manner.

First, cement 5 including water is made by mixing MgO cement and water. The cement 5 involving a specified amount of water is injected into the front inside space 42 of the cover 4 by using a dispenser and the like. Following, the thermistor 2 connected to the sheath pin 3 is inserted into the cover 4 and buried in the cement 5 involving water. At the time, the sheath pin 3 is fed until the front part 32 of the sheath pin 3 is contacted with the contact positioning part 41 of the cover 4.

The cement 5 is then dried at an ordinary temperature (or normal temperature) up to 200° C. in order to dry and harden it and to fix the thermistor element 2 into the cover 4. While performing the drying process, the front part 32 of the sheath pin 3 is contacted with the connect positioning part 41.

Because the connection paths 44 connecting the front inside space 42 to the peripheral inside space 43 are formed on the side of the contact positioning part 41, the water involved in the cement 5 is drained to the outside of the temperature element.

After the drying process of the cement 5, the fastening part 461 is formed at the large diameter part 46 in order to fasten of the sheath pin 3.

Next, a description will now be given of the action and effects of the temperature sensor of the first embodiment.

As shown in FIG. 2, because the temperature sensor 1 according to the first embodiment has the contact positioning part 41 formed in the cover 4, it is thereby possible to easily perform the positioning of the sheath pin 3 and the cover 4 in the axis direction, and it is also possible to perform the positioning of the cover 4 and the thermistor element 2 connected to the signal lines of the sheath pin 3. That is, because the positioning of the sheath pin 3 to the cover 4 is performed accuracy when the thermistor element 2 is inserted into the cover 4 in the production of the temperature sensor 1, it can be avoided to contact the thermistor element 2 to the front part of the cover 4.

In addition, on producing the temperature sensor 1, the cement 5 is firstly poured into the cover 4 and the thermistor element 2 is placed in the cover 4. At this time, the positioning of the thermistor element 2 is performed by contacting the front part 32 of the sheath pin 3 with the contact positioning part 41 of the cover 4. After the completion of the positioning of the thermistor element 2, the cement 5 is dried.

As shown in FIG. 1, the front inside space 42 of the cover 4 and the connection paths 44 through which the front inside space 42 is joined to the peripheral inside part 43 are formed between the front part 32 of the sheath pin 3 and the inside surface of the cover 4. It is thereby possible to adequately drain water involved in the cement 5 during the drying process. This performs the drying of the cement 5 certainly. It is also possible to fix the thermistor 2 to the cover 4 easily and certainly.

Further, as shown in FIG. 4, because the cover 4 has a hexagonal cross-sectional shape, it is possible to form the contact positioning part 41 and the connection paths 44. That is, as shown in FIG. 3, each part of the contact positioning part 41 is formed at the sides of the polygon such as a hexagon and the connection paths 44 are formed at the corners of the polygon. Notice that FIG. 3 shows only the cover 4 observed from the direction indicated by the arrow B shown in FIG. 1. That is, the sheath pin 3 and the thermistor element 2 are omitted from FIG. 3.

As described above, according to the first embodiment, it is possible to provide the temperature sensor capable of easily performing the positioning of the thermistor element to the cover and to fix it with certainty.

Figure 8:
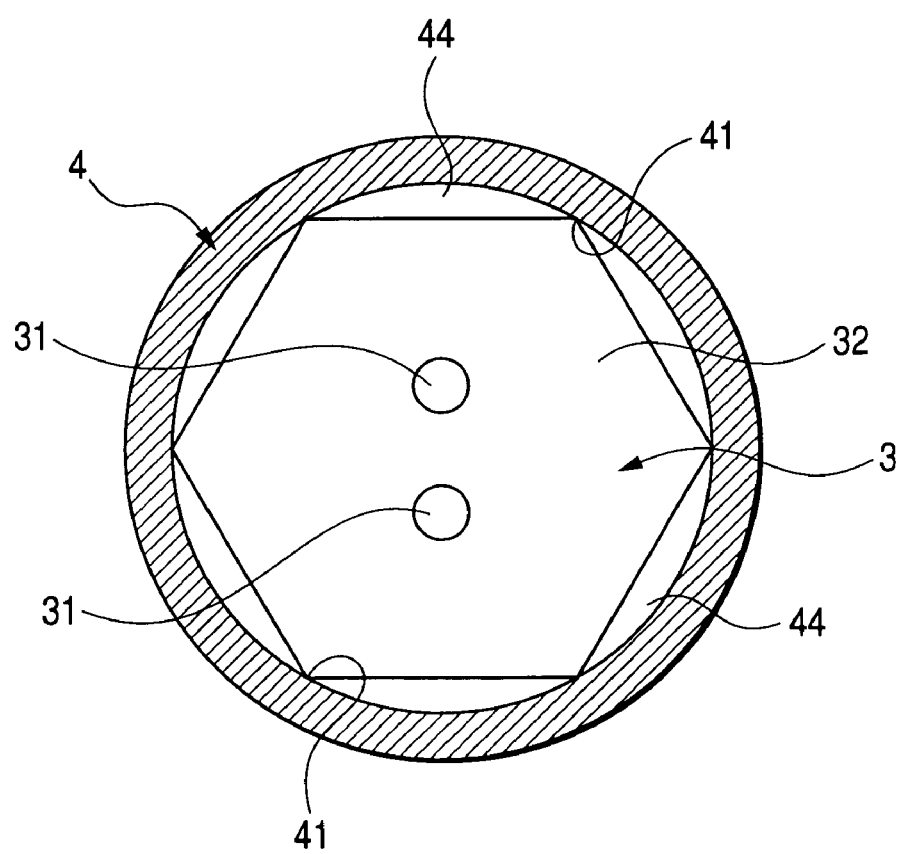
FIG. 8 is a sectional view of the front part having a rectangle shape of the sheath pin in the temperature sensor according to the first embodiment.

FIG. 8 is a sectional view of the front part having a rectangle shape of the sheath pin 3 of the temperature sensor 1 according to the first embodiment.

In the first embodiment, although the cross-sectional shape of the cover 4 at the contact positioning part 41 is a hexagonal shape, it is possible to form the front part of the sheath pin 3 into a polygonal shape, as shown in FIG. 8. In this case, it is possible to easily form the contact positioning part 41 and the connection paths 44. That is, the contact positioning part 41 is formed at the corners of the polygon, and the connection paths 44 are formed at the sides of the polygon.

Moreover, it is possible to form the shape of the contact positioning part 41 of the cover 4 and the shape of the front surface of the sheath pin 3 with a square shape, an octagon shape, and other shapes other than a hexagonal shape.

Second Embodiment

A description will be given of the temperature sensor according to the second embodiment of the present invention with reference to FIG. 9 to FIG. 12.

Figure 9:
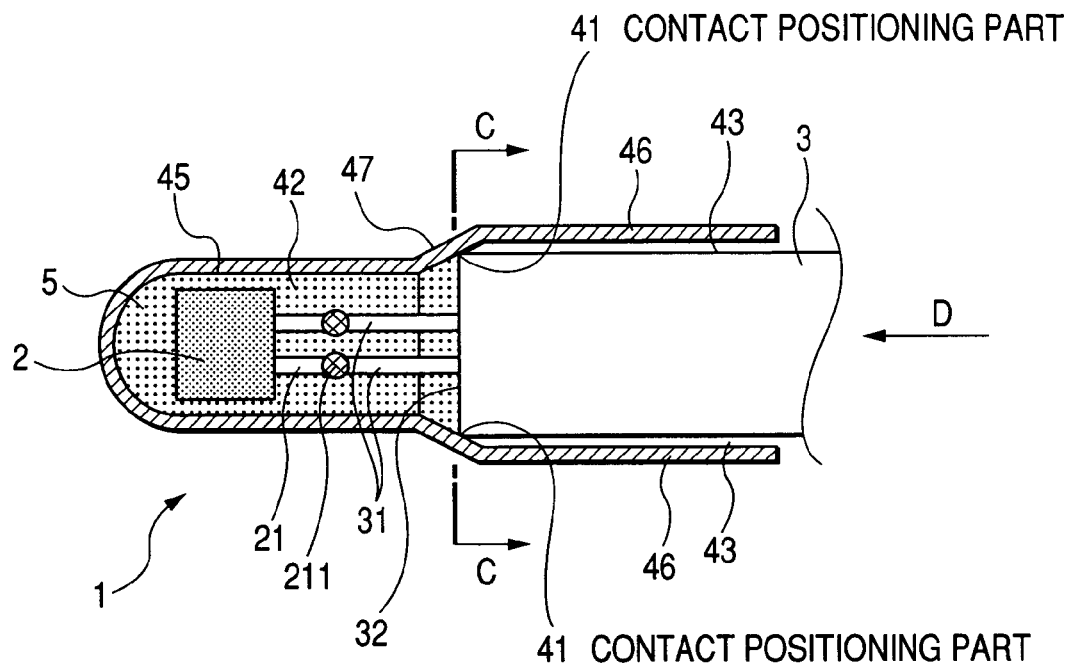
FIG. 9 is a sectional view of the area near the front part of the temperature sensor in the axis direction thereof according to a second embodiment of the present invention.
Figure 10:
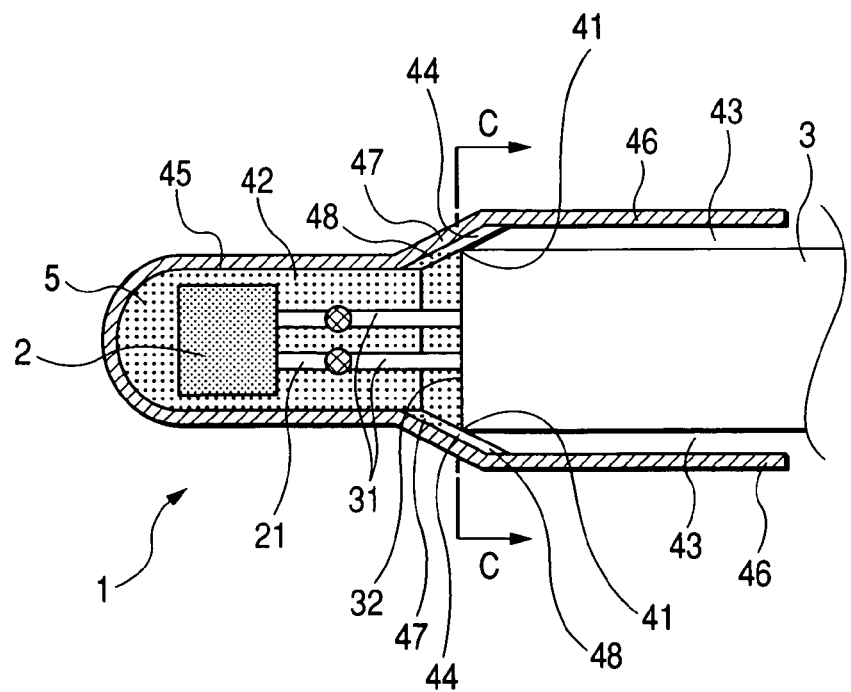
FIG. 10 is another sectional view showing the area near the front part of the temperature sensor in the axis direction thereof according to the second embodiment.
Figure 11:
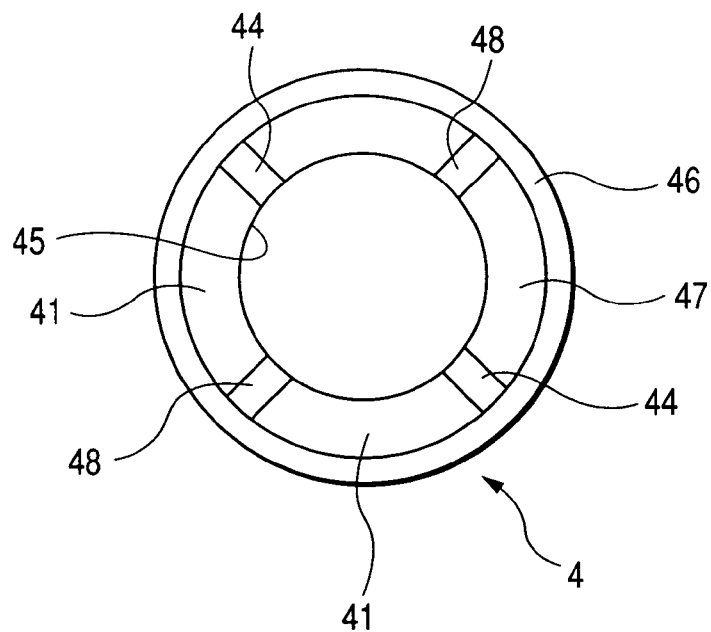
FIG. 11 is a view showing a cover placed at a rear part of the temperature sensor according to the second embodiment, observed from the direction indicated by the arrow D shown in FIG. 9.

FIG. 9 is a sectional view of the area near the front part of the temperature sensor in the axis direction thereof according to the second embodiment of the present invention. FIG. 10 is another sectional view showing the area near the front part of the temperature sensor in the axis direction thereof according to the second embodiment. FIG. 11 is a view showing the cover 4 placed at a rear part of the temperature sensor 1 of the second embodiment, observed from the direction indicated by the arrow D shown in FIG. 9. Notice that FIG. 11 shows only the cover 4 observed from the direction indicated by the arrow D shown in FIG. 9. That is, the sheath pin 3 and the thermistor element 2 are omitted from FIG. 11.

Figure 12:
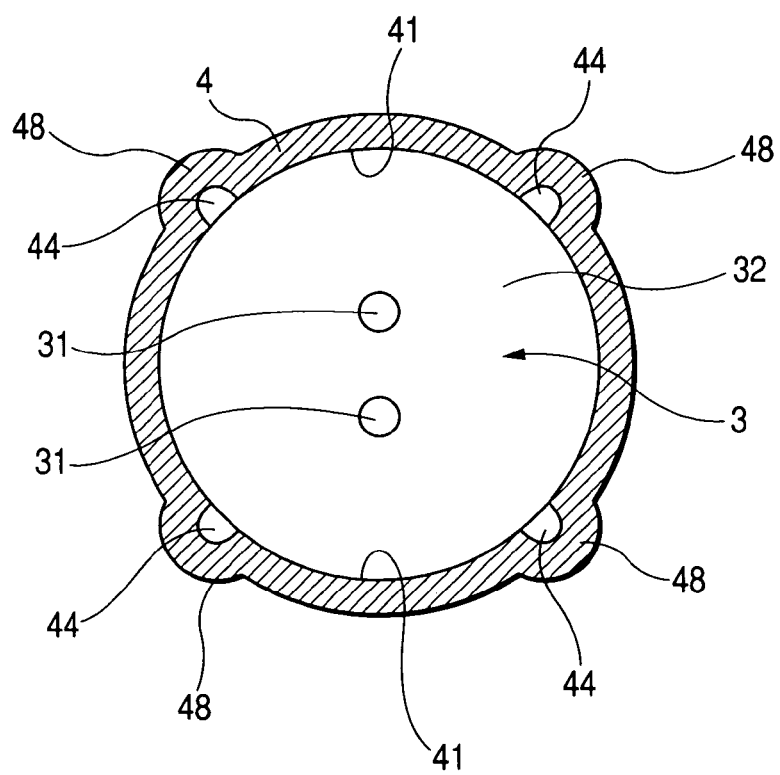
FIG. 12 is a sectional view of the temperature sensor according to the second embodiment along the line C-C shown in FIG. 9 or FIG. 10.

FIG. 12 is a sectional view of the temperature sensor of the second embodiment along the line C-C shown in FIG. 9 or FIG. 10.

As shown in FIG. 9 to FIG. 12, the cover 4 of the temperature sensor 1 has concave parts 48 which are formed at the position where the front part 32 of the sheath pin 3 is placed. Each of the concave part 48 becomes hollow toward the outside of the cover 4.

As shown in FIG. 11 and FIG. 12, the four concave parts 48 are formed at the tapered part 47. The contact positioning part 41 contacted with the front part 32 of the sheath pin 3 is formed on the tapered part 47. The shape of the concave part is approximately a semicircle (or a half circle) shape. Other components of the temperature sensor 1 of the second embodiment are the same of those of the first embodiment.

In the temperature sensor 1 of the second embodiment, the connection paths 44 are formed at the concave parts 48 and the contact positioning part 41 is formed at the area where the concave parts 48 are not formed. It is possible to perform more easily the positioning of the sheath pin 3 by forming the contact positioning part 41 at the tapered part 47 of the cover 4. The temperature sensor of the second embodiment has the same action and effects of the temperature sensor of the first embodiment.

Third Embodiment

A description will be given of the temperature sensor according to the third embodiment of the present invention with reference to FIG. 13 to FIG. 15.

Figure 13:
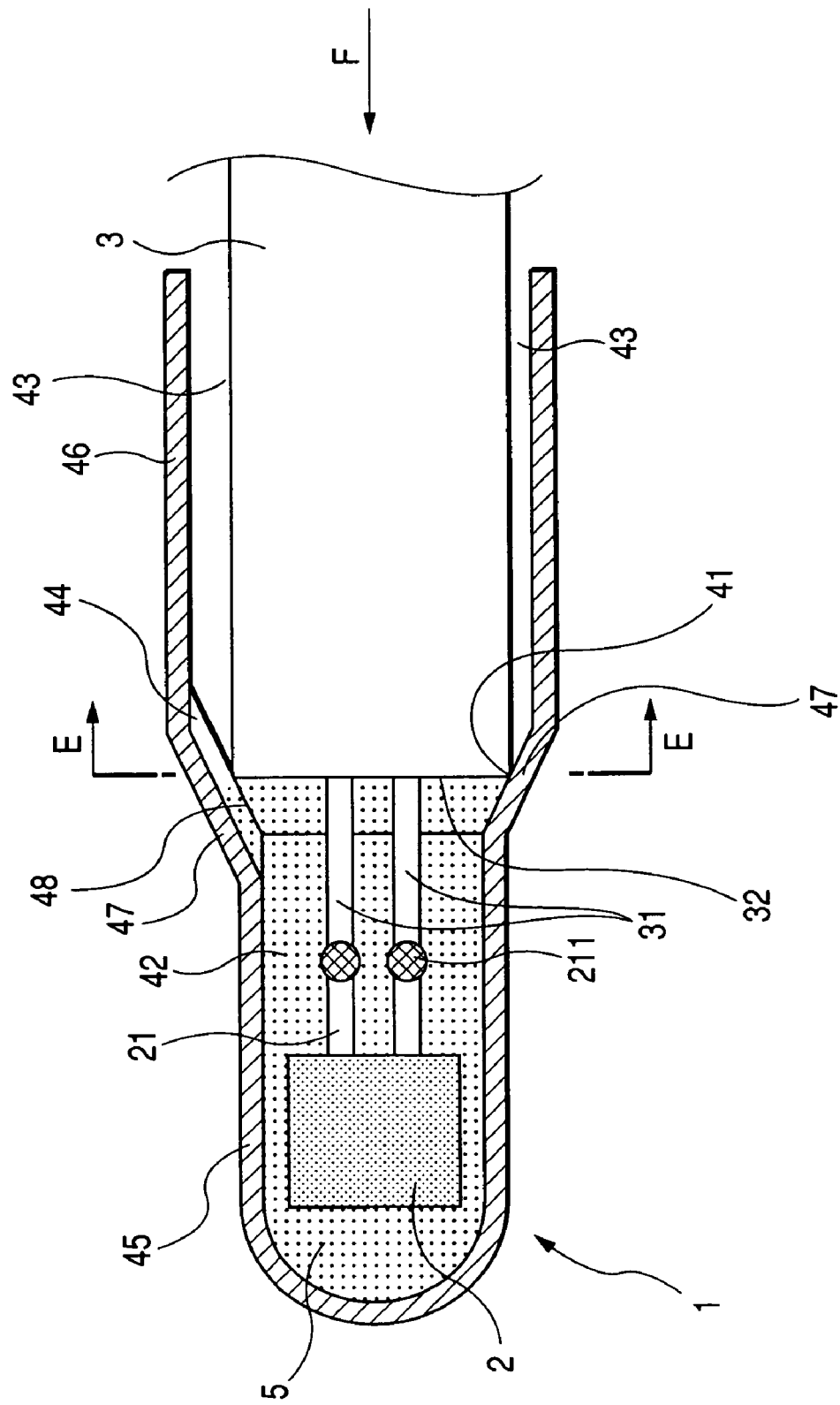
FIG. 13 is a sectional view of the area near the front part of the temperature sensor in the axis direction thereof according to a third embodiment of the present invention.

FIG. 13 is a sectional view of the area near the front part of the temperature sensor 1 in the axis direction of the third embodiment of the present invention. FIG. 14 is a view showing a cover placed at a rear part of the temperature sensor 1 of the third embodiment, observed from the direction indicated by the arrow F shown in FIG. 13. Notice that FIG. 14 shows only the cover 4 observed from the direction indicated by the arrow F shown in FIG. 13. The sheath pin 3 and the thermistor element 2 are omitted from FIG. 14.

Figure 15:
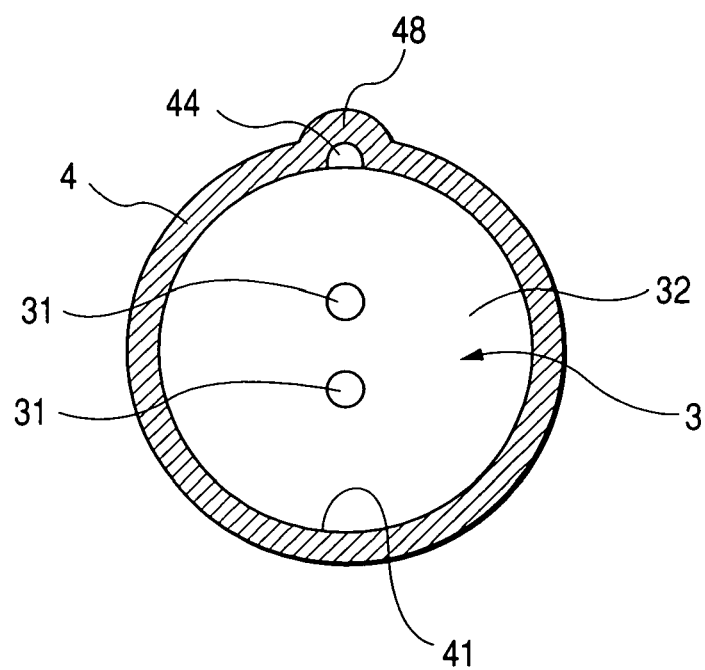
FIG. 15 is a sectional view of the temperature sensor according to the third embodiment along the line E-E shown in FIG. 13.

FIG. 15 is a sectional view of the temperature sensor 1 of the third embodiment along the line E-E shown in FIG. 12.

Figure 14:
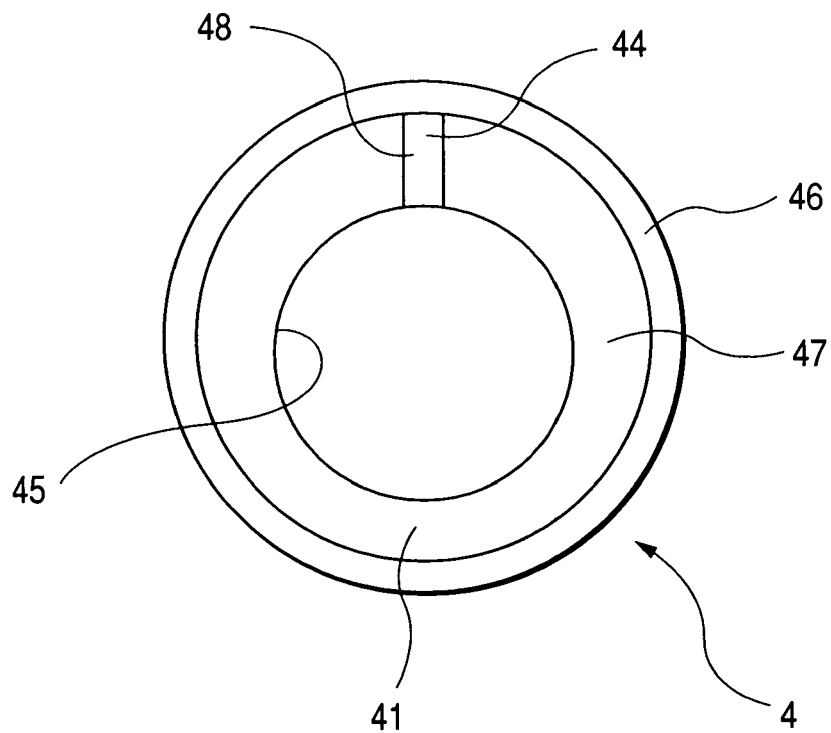
FIG. 14 is a view showing a cover placed at a rear part of the temperature sensor according to the third embodiment, observed from the direction indicated by the arrow F shown in FIG. 13.

Although the temperature sensor of the second embodiment shown in FIG. 12 has the plural concave parts 48, the temperature sensor of the third embodiment has one concave part 48 formed at the tapered part 47 of the cover 4, as shown in FIG. 13, FIG. 14, and FIG. 15. Further, the one connection path 44 is formed at the tapered part 47. Because other components of the temperature sensor of the third embodiment are the same of those of the second embodiment, the explanation of the same components is omitted.

The temperature sensor of the third embodiment has the same action and effects of the temperature sensor of the second embodiment.

It is acceptable to form one or more concave parts 48 in the temperature sensor, for example, two, three, or five concave parts, or more.

Although the shape of the concave part 48 is a semicircle shape, the present invention is not limited by this shape, it is acceptable that the shape of the concave part 48 is a semi-elliptic shape, a semi-triangle shape, and the like, other than the semicircle shape.

Fourth Embodiment

A description will be given of the temperature sensor according to the fourth embodiment of the present invention with reference to FIG. 16, FIG. 17, FIG. 18, and FIG. 19.

Figure 16:
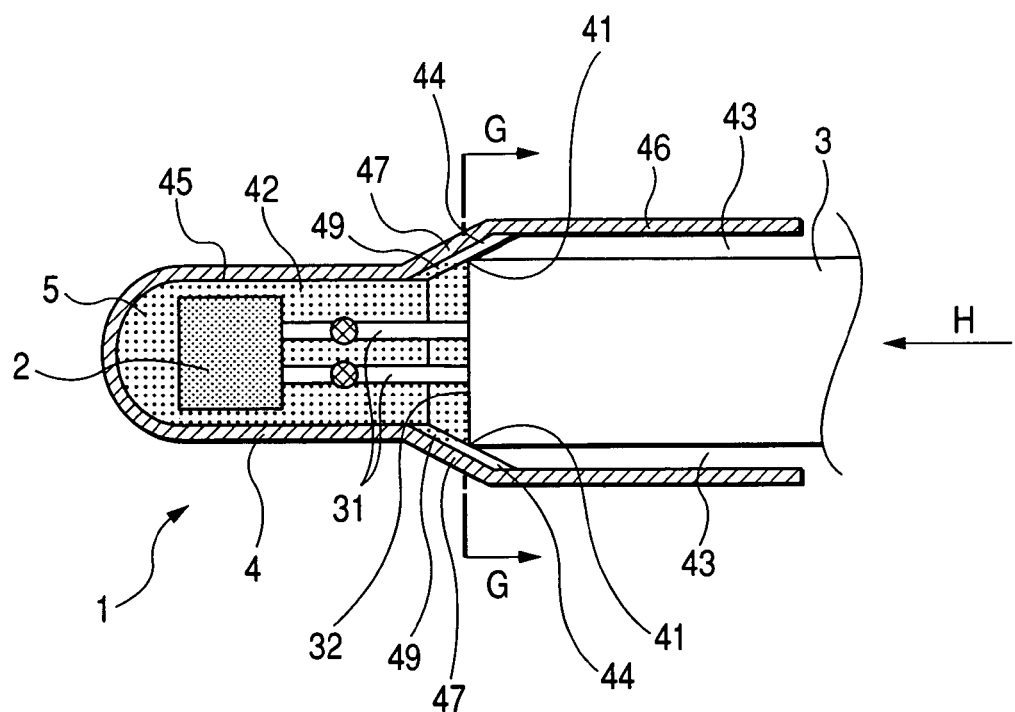
FIG. 16 is a sectional view showing a part near a front part of a temperature sensor in the axis direction thereof according to a fourth embodiment of the present invention.
Figure 17:
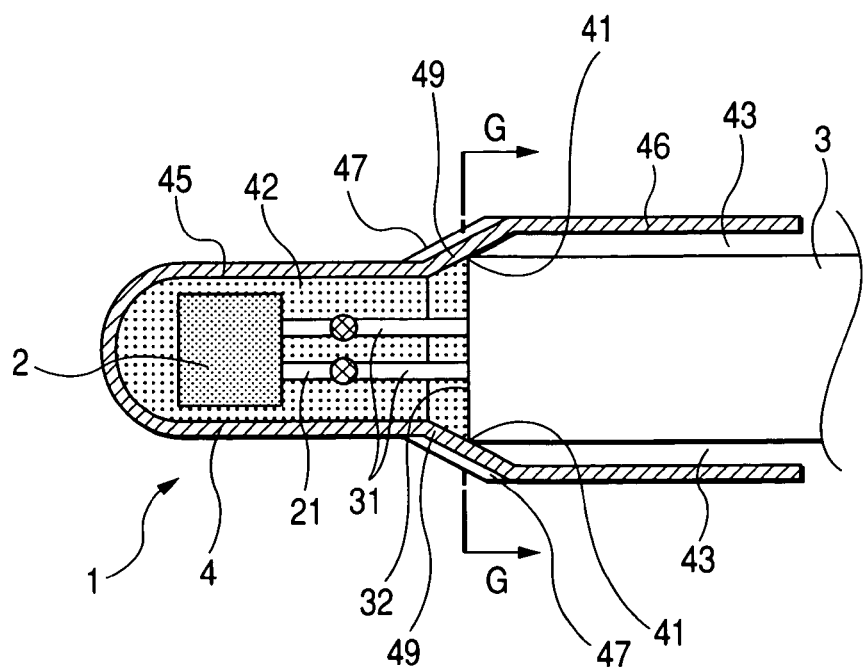
FIG. 17 is another sectional view showing the area near the front part of the temperature sensor in the axis direction thereof according to the fourth embodiment.
Figure 18:
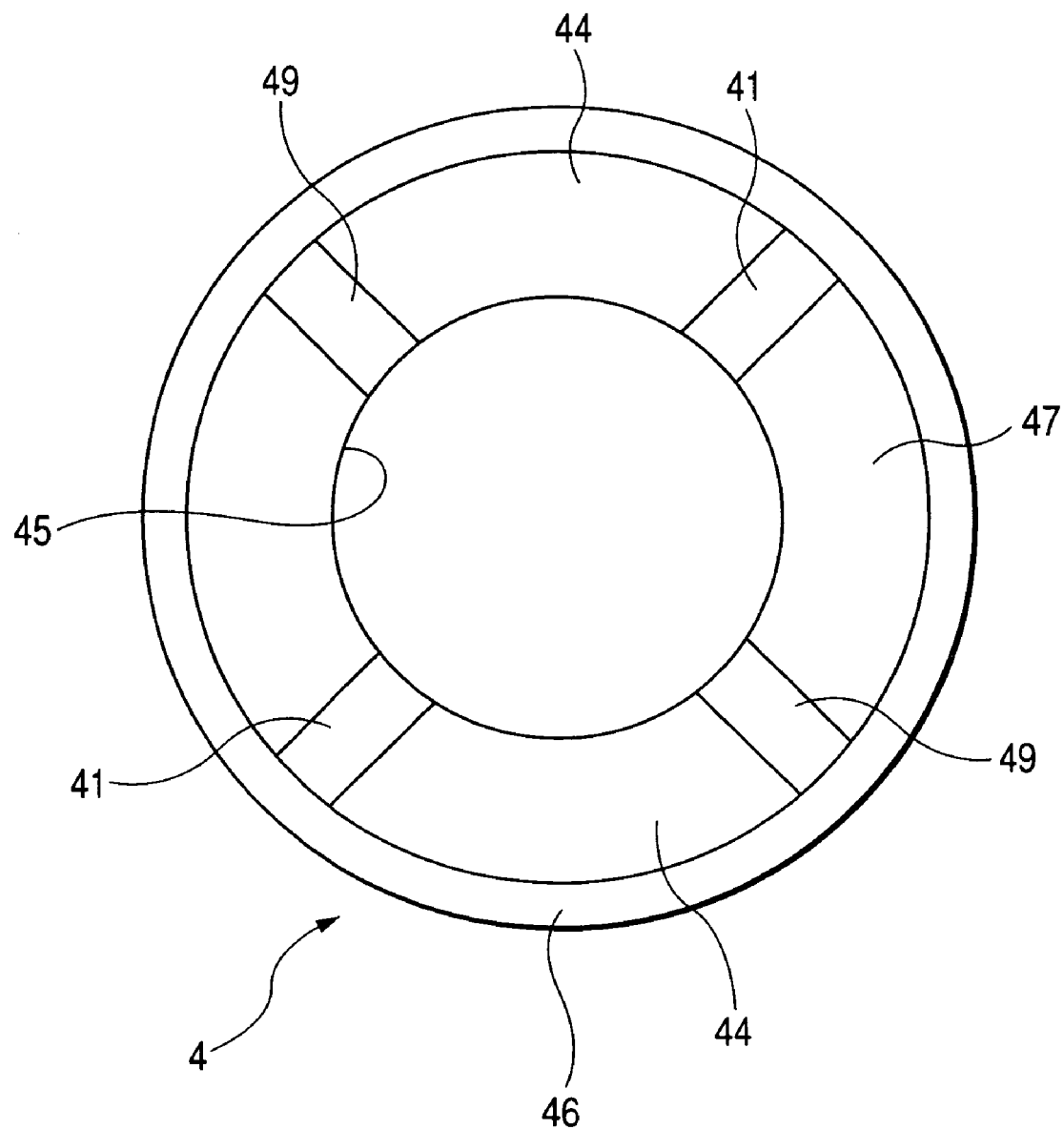
FIG. 18 is a view showing a cover placed at a rear part of the temperature sensor according to the fourth embodiment, observed from the direction indicated by the arrow H shown in FIG. 16.

FIG. 16 is a sectional view showing a part near a front part of the temperature sensor 1 in the axis direction of the fourth embodiment of the present invention. FIG. 17 is another sectional view showing the area near the front part of the temperature sensor 1 in the axis direction of the fourth embodiment. FIG. 18 is a view showing the cover 4 placed at the front part of the temperature sensor 1 of the fourth embodiment, observed from the direction indicated by the arrow H shown in FIG. 16. Notice that FIG. 18 shows only the cover 4 observed from the rear part of the temperature sensor 1. That is, the sheath pin 3 and the thermistor element 2 are omitted from FIG. 18.

Figure 19:
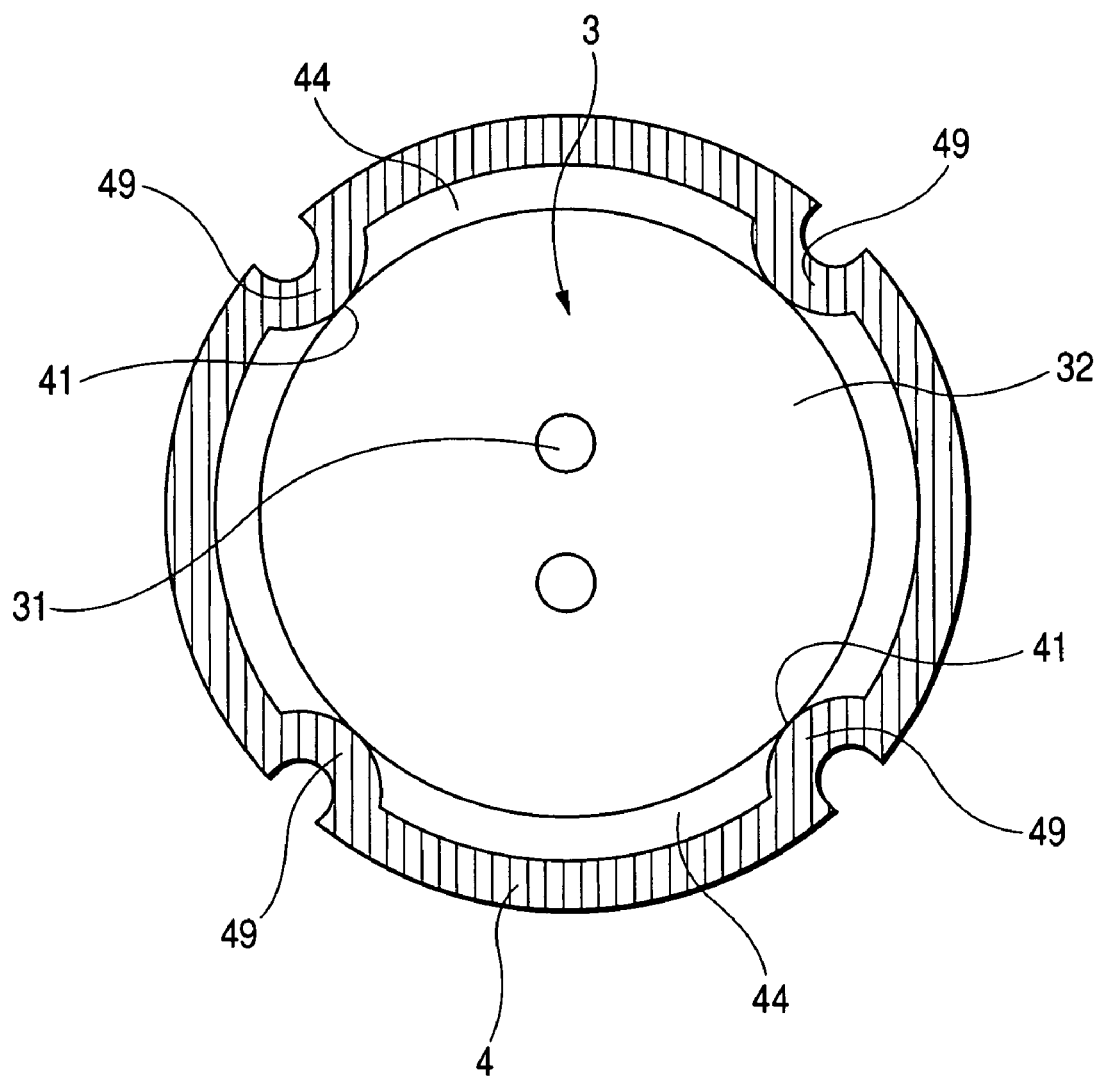
FIG. 19 is a sectional view of the temperature sensor according to the fourth embodiment along the line G-G shown in FIG. 16 or FIG. 17.

FIG. 19 is a sectional view of the temperature sensor 1 of the fourth embodiment along the line G-G shown in FIG. 16 or FIG. 17.

As shown in FIG. 16, FIG. 17, FIG. 18, and FIG. 19, the temperature sensor 1 of the fourth embodiment has convex parts 49 formed at the position where the front part 32 of the sheath pin 3 is placed and fixed, and the convex parts 49 project toward the inside of the cover 4. Further, as shown in FIG. 18 and FIG. 19, the four convex parts 49 are formed at the tapered part 47, and each of the four parts of the contact positioning part 41 with which the front part 32 of the sheath pin 3 is contacted is formed at the convex part 49. Each convex part 49 has a semi-circle shape.

Because other components of the temperature sensor of the fourth embodiment are the same of those of the first embodiment, the explanation of the same components is omitted.

In the temperature sensor 1 of the fourth embodiment, the four parts of the contact positioning part 41 are formed at the convex parts 49 of the cover 4, and the connection paths 44 are formed at the remaining parts of the cover 4 where no convex part 49 is formed.

In addition, it is possible to perform more easily the positioning of the sheath pin 3 by the presence of the contact positioning part 41 formed at the tapered part 47 of the cover 4.

Because other action and effects of the temperature sensor of the fourth embodiment are the same as those of the temperature sensor of the first embodiment, the explanation of the same components is omitted.

By the way, it is sufficient that the number of the convex parts 49 is one or more, for example, two, three, five, or more.

It is acceptable that the shape of the concave part 48 could be a semi-elliptic shape, a semi-triangle shape, and the like, other than the semicircle shape.

Fifth Embodiment

A description will be given of the temperature sensor according to the fifth embodiment of the present invention with reference to FIG. 20, FIG. 21, and FIG. 22.

Figure 20:
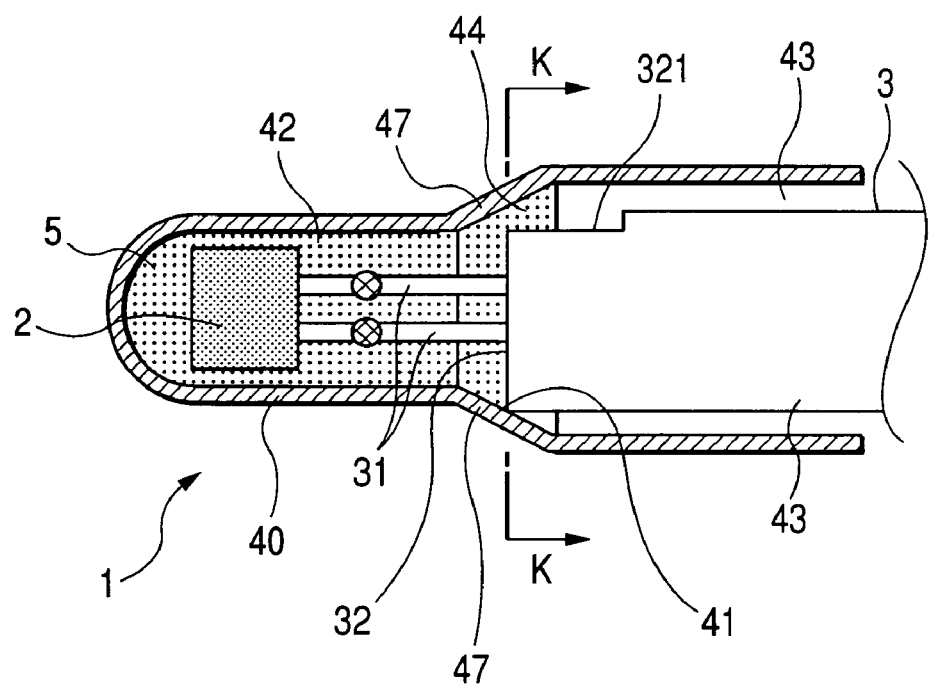
FIG. 20 is a sectional view showing a front part of a temperature sensor in the axis direction thereof according to a fifth embodiment of the present invention.
Figure 21:
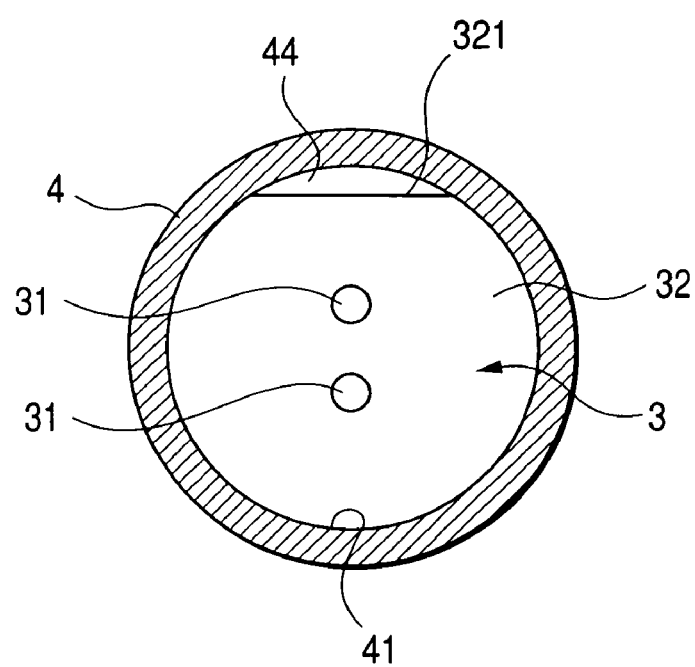
FIG. 21 is a sectional view of the temperature sensor according to the fifth embodiment along the line K-K shown in FIG. 20.

FIG. 20 is a sectional view showing a front part of a temperature sensor in the axis direction thereof according to the fifth embodiment of the present invention. FIG. 21 is a sectional view of the temperature sensor according to the fifth embodiment along the line K-K shown in FIG. 20. FIG. 22 is a sectional view of the temperature sensor having the sheath pin, a pair of notch part 321 are formed at the front part of the sheath pin, according to the fifth embodiment of the present invention;

As shown in FIG. 20 and FIG. 21, the notch part 321 of a flat surface is formed at the front part of the sheath pin in the temperature sensor.

Figure 22:
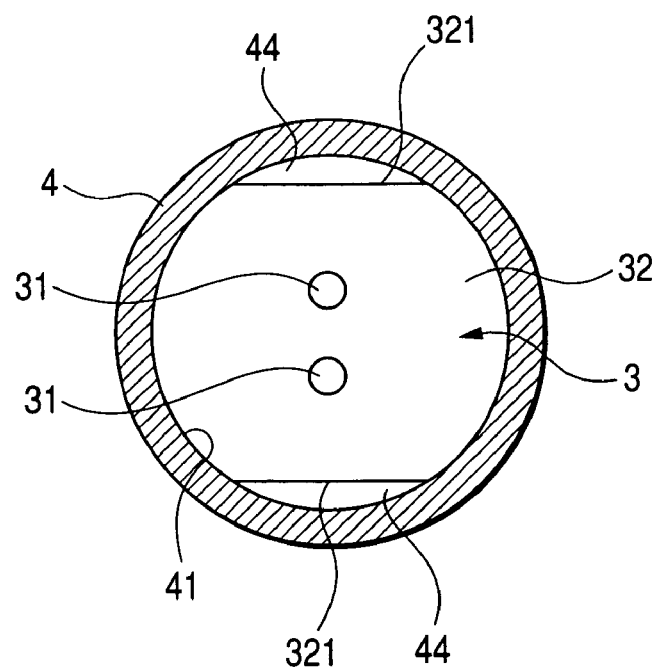
FIG. 22 is a sectional view of the temperature sensor having the sheath pin, a pair of notch parts are formed at the front part of the sheath pin, according to the fifth embodiment of the present invention.

As shown in FIG. 22, it is acceptable to form a pair of the notch parts 321 or plural notch parts of a flat surface on the front part of the sheath pin in the temperature sensor.

Other components of the temperature sensor of the fifth embodiment are the same of those of the first embodiment. Therefore the explanation of the same components is omitted here.

In the configuration of the temperature sensor according to the fifth embodiment, it is possible to form the contact parts 41 on the area of the sheath pin 3 where no notch part 321 is formed, and to form the connection paths 44 on the notch parts 321.

Because the notch part 321 takes a flat surface, it is possible to easily form the notch parts 321 on the sheath pin 3.

Other actions and features of the temperature sensor of the fifth embodiment have the same as those of the first embodiment.

Sixth Embodiment

A description will be given of the temperature sensor according to the sixth embodiment of the present invention with reference to FIG. 23.

Figure 23:
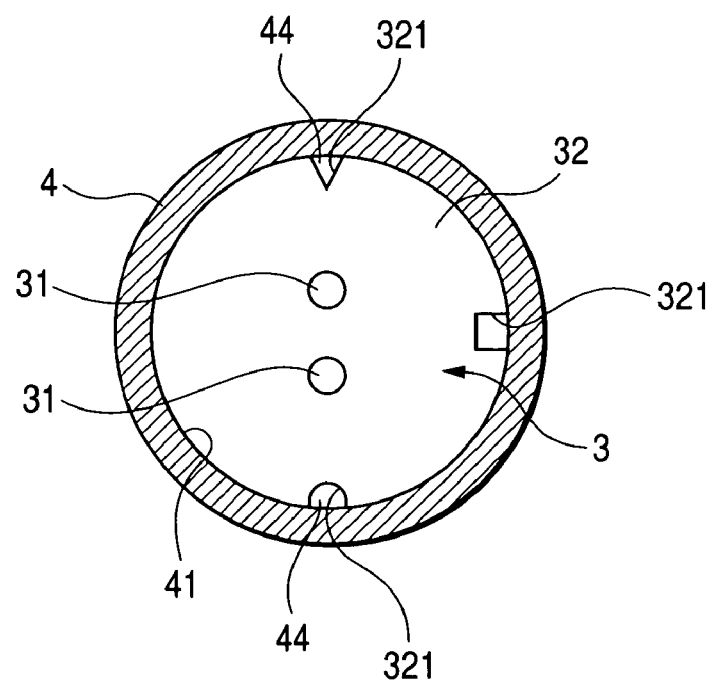
FIG. 23 is a sectional view of a temperature sensor having a sheath pin in which grooves are formed at the front part thereof as the notch part according to a sixth embodiment of the present invention.

FIG. 23 is a sectional view of a temperature sensor in which grooves are formed at the front part of the sheath pin as the notch part according to the sixth embodiment of the present invention.

As shown in FIG. 23, the grooves are formed at the front part of the sheath pin 3 as the notch parts 321 disclosed in the fifth embodiment. It is acceptable that a sectional shape of each groove has a triangle shape, a square shape, and a half-circle shape, and the like. As shown in FIG. 23, it is acceptable to form plural notch parts 321 and grooves having various shapes on the sheath pin or to form plural notch parts 321 of a single shape. Further, it is acceptable to have one or more notch parts on the sheath pin.

Other components of the temperature sensor of the sixth embodiment are the same of those of the first embodiment. Therefore the explanation of the same components is omitted here.

According to the temperature sensor of the sixth embodiment, it is possible to easily form the connection paths 44 of a desired size.

Other action and feature of the temperature sensor of the sixth embodiment have the same as those of the first embodiment.

COMPARISON EXAMPLE

A description will be given of a temperature sensor 1909 of a related-art comparison example with reference to FIG. 24, FIG. 25, and FIG. 26 in order to compare it with the temperature sensors of the first to fourth embodiments of the present invention.

Figure 24:
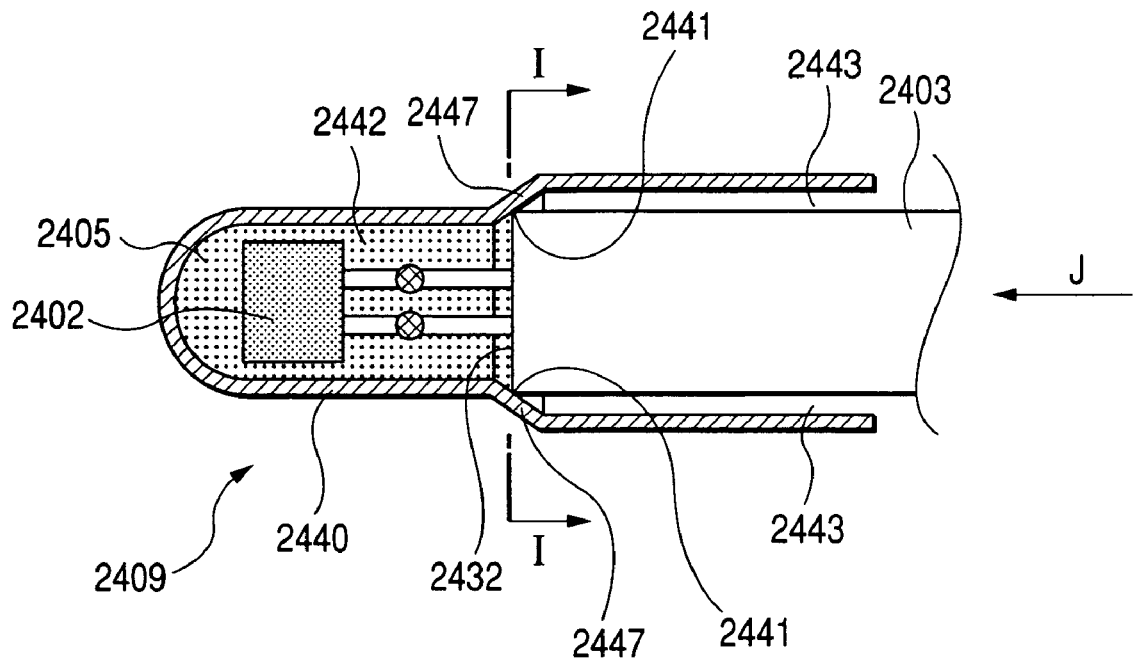
FIG. 24 is a sectional view showing a part near a front part of a temperature sensor in the axis direction thereof as a comparison example (related art)

FIG. 24 is a sectional view showing a part near a front part of the temperature sensor 2409 as the comparison example in the axis direction thereof. FIG. 25 is a view of a cover 2440 near the front part of the temperature sensor 2409 as the comparison example, observed from the direction indicated by the arrow J shown in FIG. 24. Notice that FIG. 25 shows only the cover 2440 observed from a rear part of the temperature sensor 2409. That is, the sheath pin 2403 and the thermistor element 2409 are omitted from FIG. 25. FIG. 26 is a sectional view of the temperature sensor 2409 as the comparison example along the line I-I shown in FIG. 24.

Figure 25:
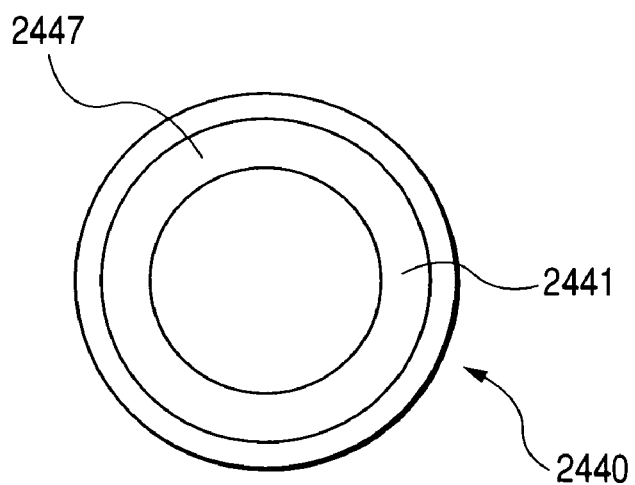
FIG. 25 is a view of a cover near the front part of the temperature sensor of the comparison example, observed from the direction indicated by the arrow J shown in FIG. 24.
Figure 26:
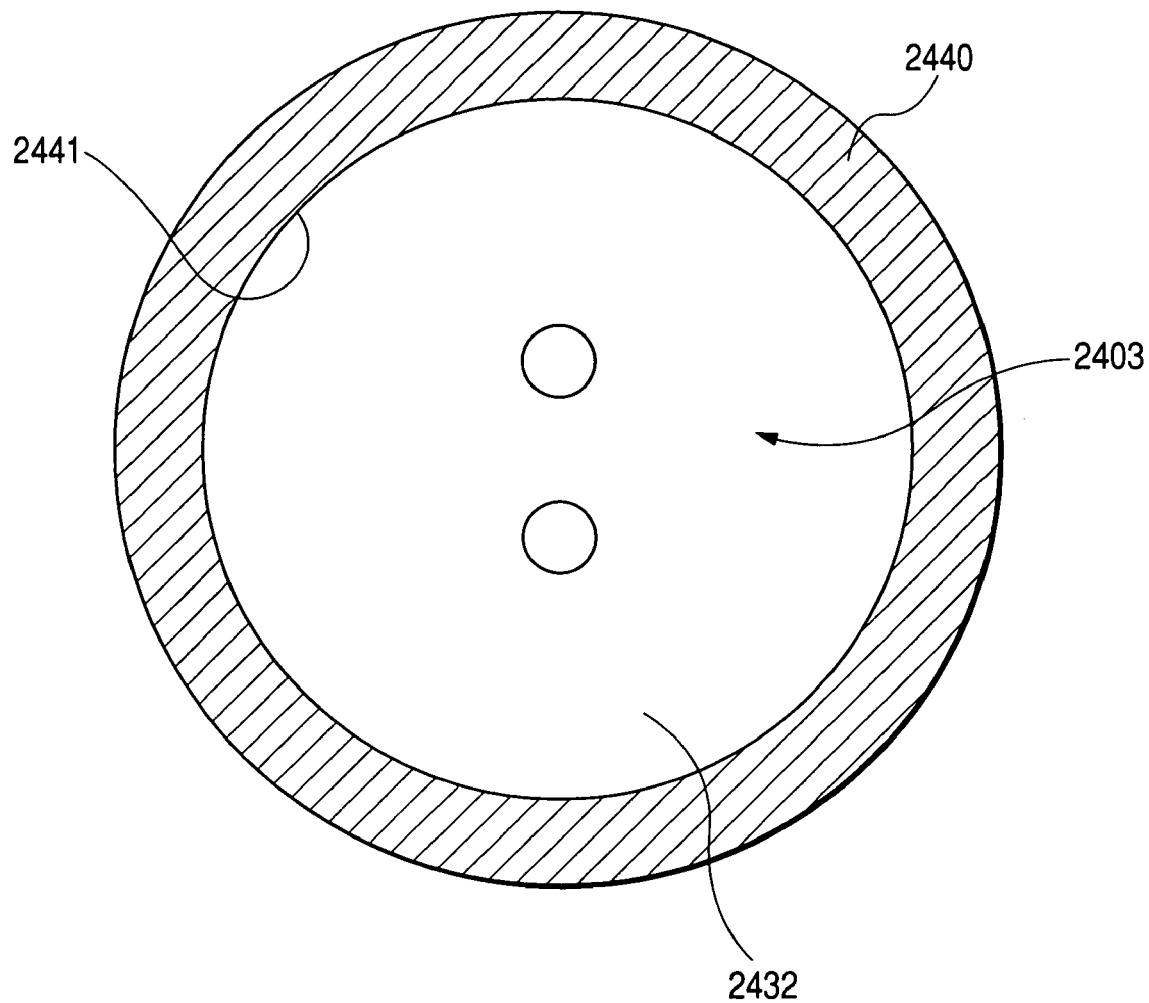
FIG. 26 is a sectional view of the temperature sensor of the comparison example along the line I-I shown in FIG. 24.

As shown in FIG. 24, FIG. 25, and FIG. 26, the temperature sensor 2409 of the related-art comparison example in which the entire surface of a front part 2432 of a sheath pin 2403 is contacted with an inside surface of a tapered part 2447, and a front inside space 2442 of the cover 2440 is separated from and completely sealed to a peripheral inside space 2443. That is, the temperature sensor 2409 as the comparison example has no connection path 44 shown in FIG. 1, FIG. 4, FIG. 10, and FIG. 12.

As shown in FIG. 24, FIG. 25, and FIG. 26, the temperature sensor 2409 of the related-art comparison example has the thermistor element 2402 composed of a pair of electrodes, the sheath pin 2403 having a pair of signal lines connected to the electrodes, and the cover 2440 placed at a front part of the temperature sensor 2409 that accommodates the thermistor element 2402.

In the temperature sensor of the related-art comparison example shown in FIG. 24 to FIG. 26, it is difficult to dry cement 2405 rapidly and efficiently, which is poured in a space formed between the inside of the cover 2440 and the thermistor element 2402. That is, on producing the temperature sensor 2409, the thermistor element 2402 is inserted to and placed in the cover 2440 that is filled with the cement 2405 involving water. The positioning of the thermistor element 2402 to the cover 2440 is performed by contacting the front part 2432 of the sheath pin 2403 with the contact part 2441 of the cover 2440, and the cement 2405 is then dried.

However, when positioning the thermistor element 2402 of the related-art comparison example, as shown in FIG. 24 and FIG. 26, the front inside space 2442 of the cover 2440 is shielded from the peripheral inside space 2443 formed between the inside of the cover 2440 and the sheath pin 2403 by the front part 2432 of the sheath pin 2403. This configuration prevents the cement 2405 drying because it is difficult to keep the path through which water component involved in the cement 2405 is drained or discharged to the outside of the temperature sensor 2409.

Thus, it is difficult for the temperature sensor 2409 having the above configuration to dry the cement 2405 adequately and rapidly. This leads to difficulty in performing the positioning of the thermistor element 2 to the cover 1940 and further increases the manufacturing time and cost.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A temperature sensor comprising:
   a thermistor element having a pair of electrodes;
   a sheath pin in which a pair of signal lines is embedded, the signal line pair being connected to the electrode pair of the thermistor element, respectively, and a front part of each signal line being exposed from the sheath pin;
   a cover surrounding the thermistor element therein and arranged at a front part of the temperature sensor, the cover having a contact positioning part with which a front part of the sheath pin contacts during positioning; and
   a cement filling between an inside space of the cover and the thermistor element placed in a front part located in front of the contact positioning part of the cover, in order to support and fix the thermistor element to the cover,
   wherein connection paths are formed between the front part of the sheath pin and the inside surface of the cover, through which the front inside space of the cover located in front of the front part of the sheath pin is joined to a peripheral inside space of the cover located in the front part of the sheath pin; and
   wherein a cross-section of the contact positioning part in the cover has a polygonal shape.

2. The temperature sensor according to claim 1, wherein the cover has a tapered part that is inclined from the front part toward the rear part of the temperature sensor, and the contact positioning part is formed at the tapered part of the cover.

3. The temperature sensor according to claim 1, wherein a cross-section of the contact positioning part in the cover has one of a square shape, a hexagonal shape, and an octagon shape.

4. The temperature sensor according to claim 1, wherein the connection paths are formed at corners of the contact positioning part whose cross-section is the polygonal shape.

5. A temperature sensor comprising:
   a thermistor element having a pair of electrodes;
   a sheath pin in which a pair of signal lines is embedded, the signal line pair being connected to the electrode pair of the thermistor element, respectively, and a front part of each signal line being exposed from the sheath pin;
   a cover surrounding the thermistor element therein and arranged at a front part of the temperature sensor, the cover having a contact positioning part with which a front part of the sheath pin contacts during positioning; and
   a cement filling between an inside space of the cover and the thermistor element placed in a front part located in front of the contact positioning part of the cover, in order to support and fix the thermistor element to the cover,
   wherein connection paths are formed between the front part of the sheath pin and the inside surface of the cover, through which the front inside space of the cover located in front of the front part of the sheath pin is joined to a peripheral inside space of the cover located in the front part of the sheath pin; and
   wherein the surface of the front part of the sheath pin has a polygonal shape and at least one notch is formed at the front part of the sheath pin.

6. The temperature sensor according to claim 5, wherein the surface of the front part of the sheath pin has one of a square shape, a hexagonal shape, and an octagon shape.

7. A temperature sensor comprising:
   a thermistor element having a pair of electrodes;
   a sheath pin in which a pair of signal lines is embedded, the signal line pair being connected to the electrode pair of the thermistor element, respectively, and a front part of each signal line being exposed from the sheath pin;
   a cover surrounding the thermistor element therein and arranged at a front part of the temperature sensor, the cover having a contact positioning part with which a front part of the sheath pin contacts during positioning; and a cement filling between an inside space of the cover and the thermistor element placed in a front part located in front of the contact positioning part of the cover, in order to support and fix the thermistor element to the cover, wherein connection paths are formed between the front part of the sheath pin and the inside surface of the cover, through which the front inside space of the cover located in front of the front part of the sheath pin is joined to a peripheral inside space of the cover located in the front part of the sheath pin; and wherein the cover has at least one convex part formed at the contact positioning part where the front part of the sheath pin is positioned and fixed, and the convex part projects into the inside of the cover.

8. The temperature sensor according to claim 7, wherein the cover has a tapered part that is inclined from the front part toward the rear part of the temperature sensor, and the contact positioning part is formed at the tapered part of the cover.

9. The temperature sensor according to claim 7, wherein the convex part has one of a semicircle shape, a semi-elliptic shape, and a semi-triangle shape.

10. A temperature sensor comprising:
a thermistor element having a pair of electrodes;
a sheath pin in which a pair of signal lines is embedded, the signal line pair being connected to the electrode pair of the thermistor element, respectively, and a front part of each signal line being exposed from the sheath pin;
a cover surrounding the thermistor element therein and arranged at a front part of the temperature sensor, the cover having a contact positioning part with which a front part of the sheath pin contacts during positioning; and
a cement filling between an inside space of the cover and the thermistor element placed in a front part located in front of the contact positioning part of the cover, in order to support and fix the thermistor element to the cover,
wherein connection paths are formed between the front part of the sheath pin and the inside surface of the cover, through which the front inside space of the cover located in front of the front part of the sheath pin is joined to a peripheral inside space of the cover located in the front part of the sheath pin; and
wherein the cover has at least one concave part, formed at the contact positioning part where the front part of the sheath pin is positioned and fixed, and the concave part projects into the outside of the cover.

11. The temperature sensor according to claim 10, wherein the cover has a tapered part that is inclined from the front part toward the rear part of the temperature sensor, and the contact positioning part is formed at the tapered part of the cover.

12. The temperature sensor according to claim 10, wherein the concave part has one of a semicircle shape, a semi-elliptic shape, and a semi-triangle shape.

13. A temperature sensor comprising:
a thermistor element having a pair of electrodes;
a sheath pin in which a pair of signal lines is embedded, the signal line pair being connected to the electrode pair of the thermistor element, respectively, and a front part of each signal line being exposed from the sheath pin;
a cover surrounding the thermistor element therein and arranged at a front part of the temperature sensor, the cover having a contact positioning part with which a front part of the sheath pin contacts during positioning; and
a cement filling between an inside space of the cover and the thermistor element placed in a front part located in front of the contact positioning part of the cover, in order to support and fix the thermistor element to the cover,
wherein connection paths are formed between the front part of the sheath pin and the inside surface of the cover, through which the front inside space of the cover located in front of the front part of the sheath pin is joined to a peripheral inside space of the cover located in the front part of the sheath pin; and
wherein at least one notch is formed on an outer peripheral part of the front part of the sheath pin.

14. The temperature sensor according to claim 13, wherein the notch part has a flat surface.

15. The temperature sensor according to claim 13, wherein the notch part has a groove shape.

* * * * *